US009160477B2

(12) United States Patent
Patel et al.

(10) Patent No.: US 9,160,477 B2
(45) Date of Patent: Oct. 13, 2015

(54) VIRTUAL NETWORKING EMBEDDING PROCEDURE IN AN OPTICAL WAVELENGTH DIVISION MULTIPLEXING (WDM) NETWORK

(71) Applicant: NEC Laboratories America, Inc., Princeton, NJ (US)

(72) Inventors: Ankitkumar Patel, Monmouth Junction, NJ (US); Philip Nan Ji, Cranbury, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 16 days.

(21) Appl. No.: 14/177,667

(22) Filed: Feb. 11, 2014

(65) Prior Publication Data

US 2014/0226985 A1    Aug. 14, 2014

Related U.S. Application Data

(60) Provisional application No. 61/764,568, filed on Feb. 14, 2013.

(51) Int. Cl.
*H04J 14/00* (2006.01)
*H04J 14/02* (2006.01)
*H04L 12/721* (2013.01)

(52) U.S. Cl.
CPC ........... *H04J 14/021* (2013.01); *H04J 14/0257* (2013.01); *H04L 45/12* (2013.01)

(58) Field of Classification Search
CPC .............. H04J 14/0257; H04J 14/0245; H04J 14/0249; H04J 14/0267; H04J 14/0278; H04J 14/02; H04Q 2011/0086; H04L 45/12; H04L 45/586; H04L 45/62; H04L 41/0213; H04L 41/0226; H04L 12/4641; H04L 12/5695; H04L 47/17

USPC .................. 398/57, 79, 68, 49, 48
See application file for complete search history.

(56) References Cited

U.S. PATENT DOCUMENTS 5,548,639 A * 8/1996 Ogura et al. ............. 379/221.04
7,020,087 B2 * 3/2006 Steinberg et al. ............. 370/238

(Continued)

OTHER PUBLICATIONS

P. Ji, "Software Defined Optical Network," Proc. of ICOCN, No. THU-07, Nov. 2012.

(Continued)

*Primary Examiner* — Hibret Woldekidan
(74) *Attorney, Agent, or Firm* — Akitaka Kimura; Joseph Kolodka (57) ABSTRACT

A method implemented in a network apparatus used in a wavelength division multiplexing (WDM) optical network is disclosed. The method includes (a) selecting unconsidered virtual link (VL) (i,j) with a maximum cost, a cost being requested line rate $r_{ij}$ on VL(i,j)×shortest distance between nodes i and j, (b) selecting unconsidered route k out of K-shortest routes between nodes i and j of VL(i,j), (c) determining a bit map of unconsidered route k, (d) finding a modulation format that supports requested line rate $r_{ij}$ with minimum spectrum $$\left\lceil \frac{r_{ij}}{S_z} \right\rceil,$$

where $S_z$ is spectral efficiency with which the modulation format transmits a channel, (e) finding $$\left\lceil \frac{r_{ij}}{S_z} \right\rceil$$

consecutive spectrum slots at M lowest wavelengths in the bit map of selected route k, and (f) determining fragmentation factor $F_k^m$ after provisioning a channel at each wavelength m on selected route k, where $1 \le m \le M$. Other apparatuses, systems, and methods also are disclosed.

12 Claims, 5 Drawing Sheets

(56) References Cited

U.S. PATENT DOCUMENTS

| | | | | |
|---|---|---|---|---|
| 7,813,281 | B2* | 10/2010 | Bolt et al. | 370/231 |
| 8,379,663 | B2* | 2/2013 | Mitsunobu et al. | 370/458 |
| 8,705,963 | B2* | 4/2014 | Patel et al. | 398/58 |
| 8,718,097 | B2* | 5/2014 | Patel et al. | 370/477 |
| 8,781,328 | B2* | 7/2014 | Patel et al. | 398/79 |
| 8,854,997 | B2* | 10/2014 | Clow et al. | 370/252 |
| 8,873,962 | B2* | 10/2014 | Patel et al. | 398/79 |
| 8,977,123 | B2* | 3/2015 | Patel et al. | 398/49 |
| 2010/0158528 | A1* | 6/2010 | Resende et al. | 398/79 |
| 2010/0172402 | A1* | 7/2010 | Devictor et al. | 375/240.01 |
| 2010/0175101 | A1* | 7/2010 | Devictor et al. | 725/131 |
| 2010/0272110 | A1* | 10/2010 | Allan et al. | 370/395.53 |
| 2011/0103398 | A1* | 5/2011 | Mitsunobu et al. | 370/458 |
| 2011/0318004 | A1* | 12/2011 | Bruno | 398/45 |
| 2012/0070148 | A1* | 3/2012 | Patel et al. | 398/49 |
| 2012/0070150 | A1* | 3/2012 | Patel et al. | 398/79 |
| 2012/0189303 | A1* | 7/2012 | Winzer et al. | 398/43 |
| 2012/0294617 | A1* | 11/2012 | Miyamura et al. | 398/79 |
| 2013/0250792 | A1* | 9/2013 | Yoshida et al. | 370/252 |
| 2014/0099118 | A1* | 4/2014 | Zhang et al. | 398/79 |
| 2014/0178066 | A1* | 6/2014 | Patel et al. | 398/45 |
| 2014/0226967 | A1* | 8/2014 | Ahuja et al. | 398/5 |
| 2014/0226986 | A1* | 8/2014 | Patel et al. | 398/83 |
| 2014/0233956 | A1* | 8/2014 | Zami, Thierry | 398/79 |
| 2014/0379926 | A1* | 12/2014 | Patel et al. | 709/226 |
| 2014/0379927 | A1* | 12/2014 | Patel et al. | 709/226 |
| 2014/0379929 | A1* | 12/2014 | Cicic et al. | 709/226 |
| 2015/0043911 | A1* | 2/2015 | Patel et al. | 398/48 |
| 2015/0043915 | A1* | 2/2015 | Patel et al. | 398/68 |
| 2015/0046592 | A1* | 2/2015 | Patel et al. | 709/226 |
| 2015/0104166 | A1* | 4/2015 | Patel et al. | 398/5 |

OTHER PUBLICATIONS

T. Ghazar and N. Samaan, "A hierarchical approach for efficient virtual network embedding based on exact subgraph matching," in Global Telecommunications Conference (GLOBECOM 2011), 2011 IEEE, Dec. 2011, pp. 1-6.

ITU-T G.694.1, "Spectral grids for WDM applications: DWDM frequency grid," May 2002.

Y. Sone, A. Hirano, A. Kadohata, M. Jinno, and O. Ishida, "Routing and Spectrum Assignment Algorithm Maximizes Spectrum Utilization in Optical Networks," in European Conference and Exposition on Optical Communications. Optical Society of America, 2011.

A. Pagès, J. A. Garcia-Espín, J. Perelló, J. Ferrer Riera, S. Spadaro, and S. Figuerola, "Optimal Allocation of Virtual Optical Networks for the Future Internet", in Proceedings of the 16th Conference on Optical Network Design and Modeling (ONDM 2012), Apr. 2012.

* cited by examiner

VIRTUAL NETWORKING EMBEDDING PROCEDURE IN AN OPTICAL WAVELENGTH DIVISION MULTIPLEXING (WDM) NETWORK

This application claims the benefit of U.S. Provisional Application No. 61/764,568, entitled "Procedure to Measure Network Fragmentation in Optical WDM Networks," filed on Feb. 14, 2013, the contents of which are incorporated herein by reference.

This application is related to commonly assigned application Ser. No. 14/177,654, entitled "Network Fragmentation Measurement in an Optical Wavelength Division Multiplexing (WDM) Network," filed concurrently herewith, the contents of which are incorporated herein by reference.

BACKGROUND OF THE INVENTION

The present invention relates to wavelength division multiplexing (WDM) optical networks and, more particularly, to virtual network embedding in the WDM optical networks.

Current network infrastructure consists of a large number of heterogeneous proprietary network elements. Any technological evolution within this infrastructure is compounded by the increasing cost of investment since the cycle of design-integrate-deploy needs to be repeated. Thus, such infrastructure ossifies deployment of new services and network innovations.

To enable rapid innovations, recently Software-Defined Optical (SDO) Network architecture is introduced [1], which offers network virtualization through a hypervisor plane to share the same physical substrate among multiple isolated virtual network instances. Network virtualization partitions the functional role of internet providers into Infrastructure Providers (InP) and Service Providers (SP) [2]. InPs manages and maintains hardware and software resources, while SPs offers network services and applications to end users. Network hypervisor acts as a broker between InPs and SPs by mapping the Virtual Network (VN) demands from SPs over physical substrates of InPs. The process of mapping virtual nodes over physical nodes and Virtual Links (VL) over physical routes is referred to as virtual network embedding. To maximize revenue for InPs and resource availability for SPs, One of the challenges in VN embedding is how to maximize the embedded VNs over physical substrates.

In wavelength division multiplexing (WDM) optical networks, upon an arrival of a demand requesting a line rate between end nodes, an optical channel is established by allocating finite amount of spectrum on all fibers along the route. If an intermediate node along the route does not support the wavelength conversion capability, then the channel routed through a node must follow the wavelength continuity constraint, which is defined as an allocation of the same center wavelength to the channel, and the spectral continuity constraint, which is defined as an allocation of the same amount of spectrum to the channel in ingress and egress fibers at the node. To support multiple such channels over a fiber, the spectral conflict constraint must be satisfied, which is defined as an allocation of non-overlapping spectrum to the channels routes over the same fiber. When an optical channel is routed through network equipments and fibers, it accumulates linear and non-linear impairments along the route, which deteriorate the optical signal quality. To ensure a successful transmission of data, at least minimum detectable signal quality must be maintained at a receiver.

Figure 1A:
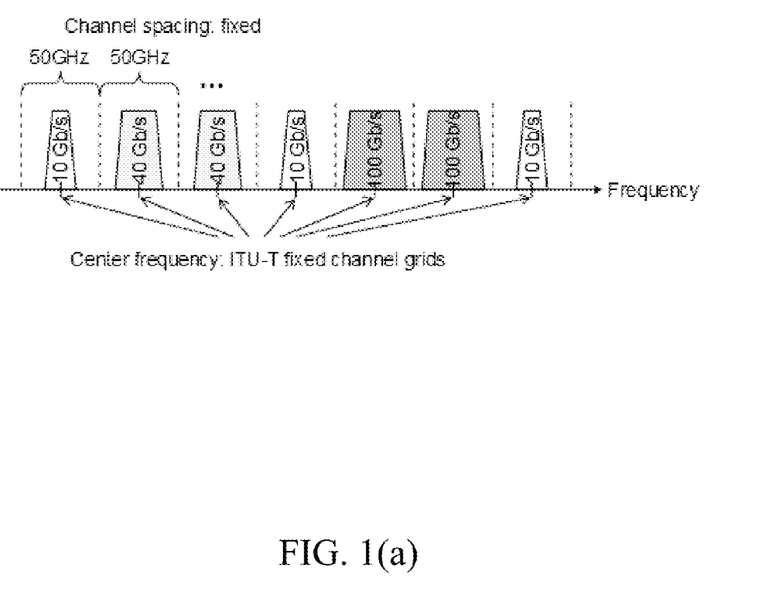
FIG. 1(a) depicts channel spacing of a fixed grid WDM network.
Figure 1B:
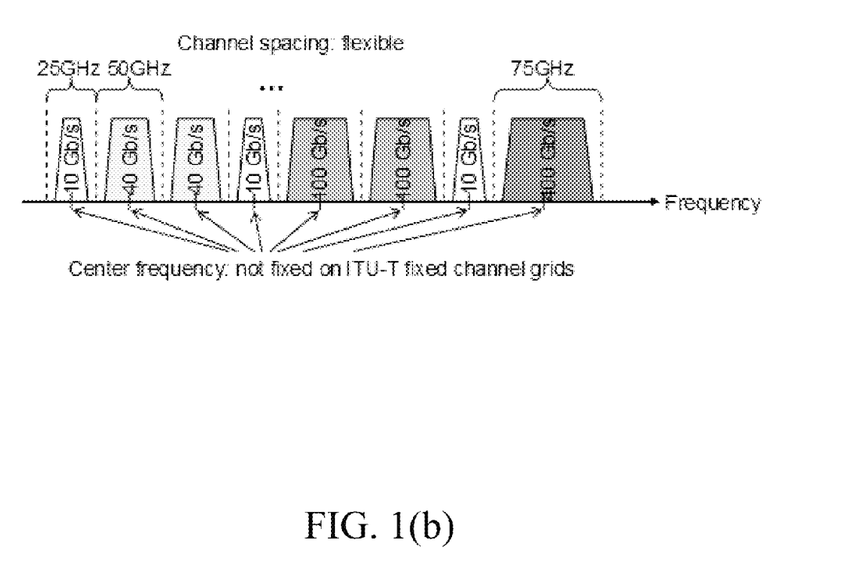
FIG. 1(b) depicts channel spacing of a flexible WDM network.
Figure 2:
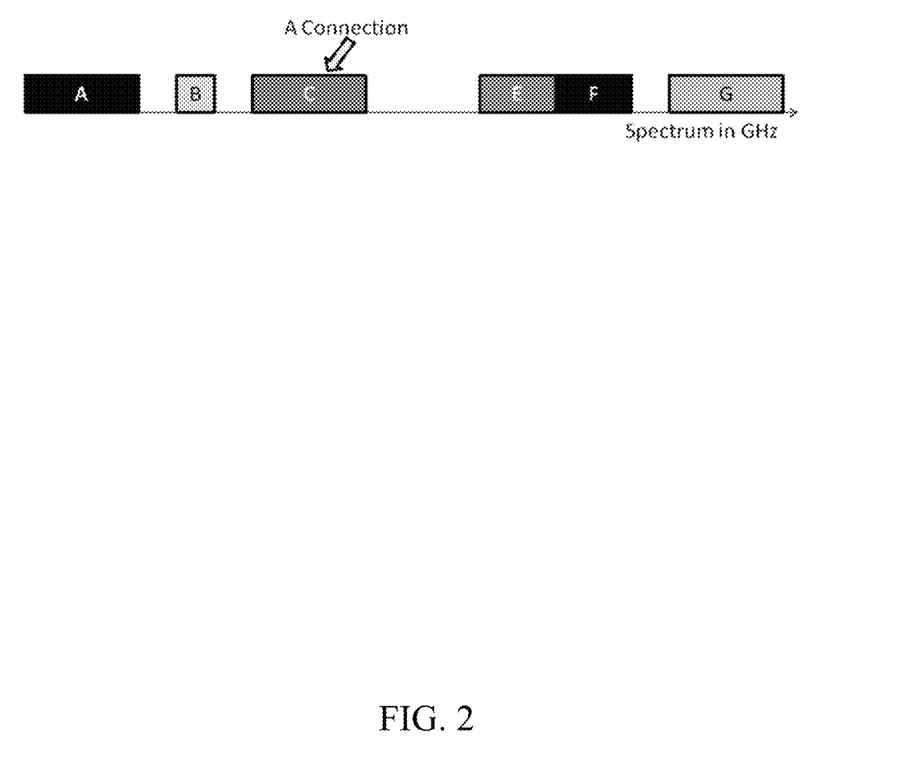
FIG. 2 depicts fragmentation in the spectrum of a fiber.

Conventionally to address interoperability issues, the International Telecommunication Union Telecommunication Standardization Sector (ITU-T) has standardized fixed channel spacing [3]. The network that follows the ITU-T standard is referred to as fixed grid network as shown in FIG. 1(a). Fixed grid networks may not optimize spectral efficiency while supporting line rates with heterogeneous granularity for ever increasing bandwidth demands. Recently, flexible grid network architecture (as shown in FIG. 1(b)) is introduced in which flexible amount of spectrum is assigned to channels based on the requirements of requested bandwidth, transmission reach, and offered modulation formats. Flexible grid networks highly optimize network spectral efficiency; however, dynamic arrival and departure of channels with heterogeneous spectrum requirements causes fragmentations in spectrum (as shown in FIG. 2), and the network can no longer be in its optimal state. The state of fragmented spectrum in a network is referred to as network fragmentation. Network fragmentation is a serious issue in fixed and flexible grid networks. Spectral fragmentation can block a connection in spite of the availability of sufficient amount of spectrum for the connection, and thus, can deteriorate the network performance.

In a software-defined optical network, an open challenge is how to map virtual networks over a flexible grid transport network while assuring the transmission reach constraints. The problem is referred to as the impairment-aware virtual network embedding over software defined flexible grid networks. The detailed problem definition is as follows.

We are given a physical network $G_p(N_p, L_p)$, where $N_p$ represents a set of reconfigurable optical add-drop multiplexer (ROADM) nodes and $L_p$ represents a set of fibers. A variable rate transponder at each node consists of an optical multicarrier modulator which can modulate subcarriers using a set Z of electrical modulation formats to vary the line rate, where Z={PM-BPSK, PM-QPSK, PM-16QAM}. Here, PM-BPSK stands for polarisation multiplexing binary phase shift-keying. PM-QPSK stands for polarisation multiplexing quadrature phase-shift keying. PM-16QAM stands for polarisation multiplexing 16 quadrature amplitude modulation.

Each modulation format z in Z can transmit a channel up to $D_z$ km with spectral efficiency $S_z$ b/s/Hz. VN demands ($G_v(N_v, L_v), R^L_v$) arrives in the network according to incremental traffic model [4] in which a permanent VN is provisioned on a one-by-one basis, where $N_v$ denotes a set of virtual nodes, $L_v$ denotes a set of virtual links, and $R^L_v$ denotes a set of requested line rates. $r_{ij}$ ($\in R^L_v$) represents a requested line rate between a virtual link (i,j) in $L_v$. The network offers Y GHz of total spectrum to support the demands. We need to find mapping of VNs over the physical substrate such that the number of embedded VNs is maximized. Mapping of a VN over physical substrate requires to find routing of virtual links over physical routes, selection of modulation formats for virtual links, and wavelength and spectrum assignment to virtual links.

In [5], the authors formulated the VN embedding problem in fixed and flexible grid networks using Integer Linear Program for static traffic model in which a set of VN demands can be provisioned in any order. The solutions in [5] ignore the physical layer impairments while provisioning VN demands. Furthermore, the proposed formulations may not guarantee an optimal solution and are not scalable for a large problem instances.

REFERENCES

[1] P. Ji, "Software Defined Optical Network," Proc. of ICOCN, no. THU-07, November 2012.

[2] T. Ghazar and N. Samaan, "A hierarchical approach for efficient virtual network embedding based on exact subgraph matching," in Global Telecommunications Conference (GLOBECOM 2011), 2011 IEEE, December 2011, pp. 1-6.

[3] ITU-T G.694.1, "Spectral grids for WDM applications: DWDM frequency grid," May 2002.

[4] Y. Sone, A. Hirano, A. Kadohata, M. Jinno, and O. Ishida, "Routing and Spectrum Assignment Algorithm Maximizes Spectrum Utilization in Optical Networks," in European Conference and Exposition on Optical Communications. Optical Society of America, 2011.

[5] A. Pages, J. A. García-Espín, J. Perelló, J. Ferrer Riera, S. Spadaro, and S. Figuerola, "Optimal Allocation of Virtual Optical Networks for the Future Internet", in Proceedings of the 16th Conference on Optical Network Design and Modeling (ONDM 2012), April 2012.

BRIEF SUMMARY OF THE INVENTION

An objective of the present invention is to map virtual networks over a WDM optical network, e.g. a flexible grid transport network.

An aspect of the present invention includes a method implemented in a network apparatus used in a wavelength division multiplexing (WDM) optical network. The method includes (a) selecting unconsidered virtual link (VL) (i,j) with a maximum cost, a cost being requested line rate $r_{ij}$ on VL(i, j)×shortest distance between nodes i and j, (b) selecting unconsidered route k out of K-shortest routes between nodes i and j of VL(i, j), (c) determining a bit map of unconsidered route k, (d) finding a modulation format that supports requested line rate $r_{ij}$ with minimum spectrum $$\left\lceil \frac{r_{ij}}{S_z} \right\rceil,$$

where $S_z$ is spectral efficiency with which the modulation format transmits a channel, (e) finding $$\left\lceil \frac{r_{ij}}{S_z} \right\rceil$$

consecutive spectrum slots at M lowest wavelengths in the bit map of selected route k, and (f) determining fragmentation factor $F_k^m$ after provisioning a channel at each wavelength m on selected route k, where $1 \le m \le M$.

Another aspect of the present invention includes a wavelength division multiplexing (WDM) optical network. The WDM optical network includes a network apparatus, wherein the network apparatus (a) selects unconsidered virtual link (VL) (i,j) with a maximum cost, a cost being requested line rate $r_{ij}$ on VL(i, j)×shortest distance between nodes i and j, (b) selects unconsidered route k out of K-shortest routes between nodes i and j of VL(i, j), (c) determines a bit map of unconsidered route k, (d) finds a modulation format that supports requested line rate $r_{ij}$ with minimum spectrum $$\left\lceil \frac{r_{ij}}{S_z} \right\rceil,$$

where $S_z$ is spectral efficiency with which the modulation format transmits a channel, (e) finds $$\left\lceil \frac{r_{ij}}{S_z} \right\rceil$$

consecutive spectrum slots at M lowest wavelengths in the bit map of selected route k, and (f) determines fragmentation factor $F_k^m$ after provisioning a channel at each wavelength m on selected route k, where $1 \le m \le M$.

Still another aspect of the present invention includes a method implemented in a network apparatus used in a wavelength division multiplexing (WDM) optical network. The method includes (a) provisioning each virtual link (VL) of a virtual network (VN) according to a cost function, where the cost function is a product of requested line rate $r_{ij}$ on VL(i, j) and shortest distance between nodes i and j, (b) mapping said each VL over one of the K-shortest routes between nodes i and j of VL(i, j), (c) provisioning a spectrum for VL(i, j) at M lowest wavelengths, and (d) selecting a wavelength and a route that minimizes fragmentation.

Means herein can comprise one or more of various kinds of components such as, for example, software, a computer program, an electronic device, a computer, and/or a dedicated controller.

DETAILED DESCRIPTION

When connections are routed with the wavelength and spectral continuity constraints over multiple fibers, the available and occupied spectrum in the fibers are correlated. The states of fibers are correlated. We design a novel procedure that takes into account the correlations of fiber states to measure network fragmentation.

We developed an effective procedure, namely (M, K)-Fragmentation-Aware VN Embedding procedure, that addresses the VN embedding problem in flexible grid networks while considering the physical layer impairments. The procedure embeds VNs over flexible transport networks while minimizing the network fragmentation such that the probability of provisioning future VN arrivals is maximized to embed the maximum number of VNs over the network.

(1) The procedure is applicable in the network hypervisor plane of a SDN controller to embed VNs.

(2) The procedure is faster than the existing solutions.

(3) The procedure can solve larger instances of the problem compared to the existing solutions.

(4) The procedure improves the utilization of network resources.

(5) The procedure is less complex than the existing solutions.

(6) The procedure is applicable in flexible as well as in fixed grid networks.

Figure 3:
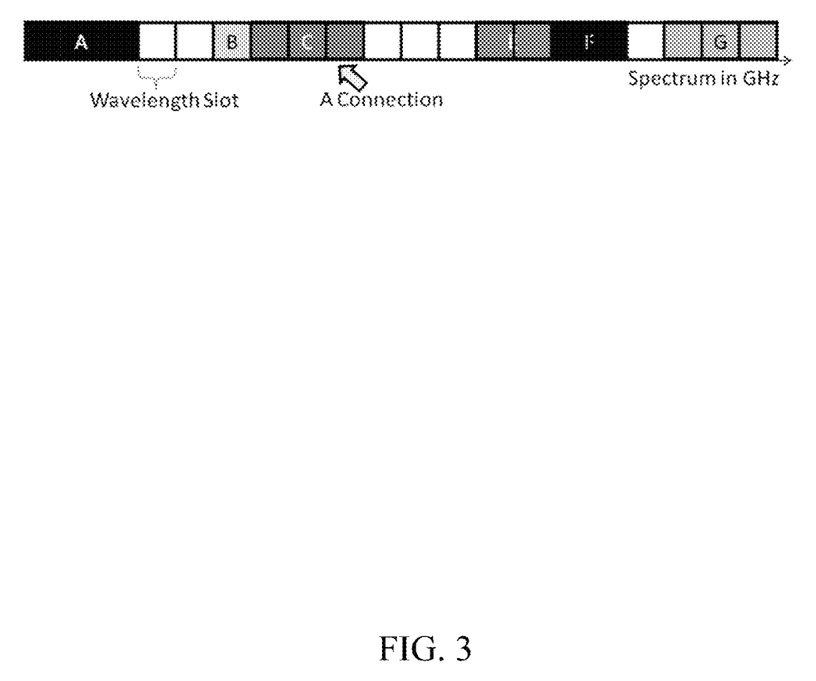
FIG. 3 depicts spectral islands and wavelenght slots in the fragmented spectrum.

To reduce the management complexity, the spectrum is slotted at the granularity of λ GHz. A slot is referred to as a wavelength slot as shown in FIG. 3. Thus, spectrum can be represented by a set of consecutive wavelength slots, and among them, the first wavelength slot index is denoted as wavelength. Thus, the network consists of total $$F = \left\lceil \frac{Y}{\lambda} \right\rceil$$

wavelength slots. The state of each wavelength slot is represented by a binary variable; '1' indicated that the wavelength slot is available and '0' indicates that the wavelength slot is occupied. The spectrum state of a fiber is represented by a binary vector. The procedure first pre-calculates up to K-shortest routes between each pair of nodes in the physical network $G_p(N_p, L_p)$, where $|N_p| \leq K$.

For a given VN demand, the (M, K)-Fragmentation-Aware procedure maps VLs of the VN over physical routes one-by-one. If at least one of the VLs cannot be mapped, the VN is considered to be blocked. First, the procedure selects a VL, (i, j), with the maximum cost function, where cost is defined as a product of the requested line rate over the VL and the shortest path distance between end nodes of the VL. Next, the procedure selects one of the K-shortest routes k between end nodes of the VL in each iteration, and finds the bit-map of the route. The bit-map of a route can be found by performing logical-AND operations on the bit-vectors of the fibers along the route. Among the offered set of modulation formats by a variable rate transponder, the procedure selects a modulation format that can support the requested line rate over the VL, $r_{ij}$, with minimum spectrum $$\left\lceil \frac{r_{ij}}{S_z} \right\rceil$$

while meeting the transmission reach requirement $B^k_{ij} \leq D_z$, where $B_{ij}^k$ denotes the physical distance of a route k between the end nodes of the virtual link (i, j). In the found bit-map of the route k, the procedure finds $$\left\lceil \frac{r_{ij}}{S_z} \right\rceil$$

number of consecutive wavelength slots at M lowest wavelengths, and evaluates the fragmentation factor $F_k^m$ of the network after provisioning the VL (i, j) at each potential wavelength $1 \leq m \leq M$ on the selected route k. A fragmentation factor (FF) is a measure of the network fragmentation. The fragmentation factor is defined as follows:

$$FF = \left[ 1 - \left\{ \frac{1}{T} \sum_{\forall (s,d)} \left( \frac{1}{K} \sum_{k=1}^{k=K} \sum_{l \in L} (Q_l \times \alpha_l^{s,d,k}) \right) \right\} \right]$$

where T is granularity at which a spectrum is slotted, (s, d) (s, d∈V and |V|≤K, where V is a set of ROADM nodes) denotes a node pair, L is an offered set of line rates, l denotes a line rate, $Q_l$ is a probability of requesting line rate l, and $\alpha_l^{s,d,k}$ is a probability of provisioning a connection with line rate l on route k between node pair (s, d). The fragmentation factor is defined also in commonly assigned application Ser. No. 14/177,654, entitled "Network Fragmentation Measurement in an Optical Wavelength Division Multiplexing (WDM) Network."

The procedure repeats the same procedure for all K-shortest routes and determines the fragmentation factor for M lowest wavelengths at which the required spectrum is available on each potential route k. If sufficient spectrum is not available on any of the K-shortest routes, then the procedure releases the reserved spectral resources for the provisioned VLs of the VN and blocks the VN demand, otherwise the procedure selects a combination of a wavelength m and a route k that has minimum fragmentation factor $F_k^m$. The procedure provisions spectral resources at the selected wavelength m on the selected route k. If any of the VL links is not yet blocked, then the procedure subsequently selects an unconsidered VL with the maximum cost and repeats the same procedure until all VLs of the VN are satisfied. Since the procedure evaluates M potential wavelengths over K potential routes, and provisions VNs over the network with the objective of minimizing fragmentation, the procedure is named as (M, K)-Fragmentation-Aware VN Embedding Procedure.

Figure 4:
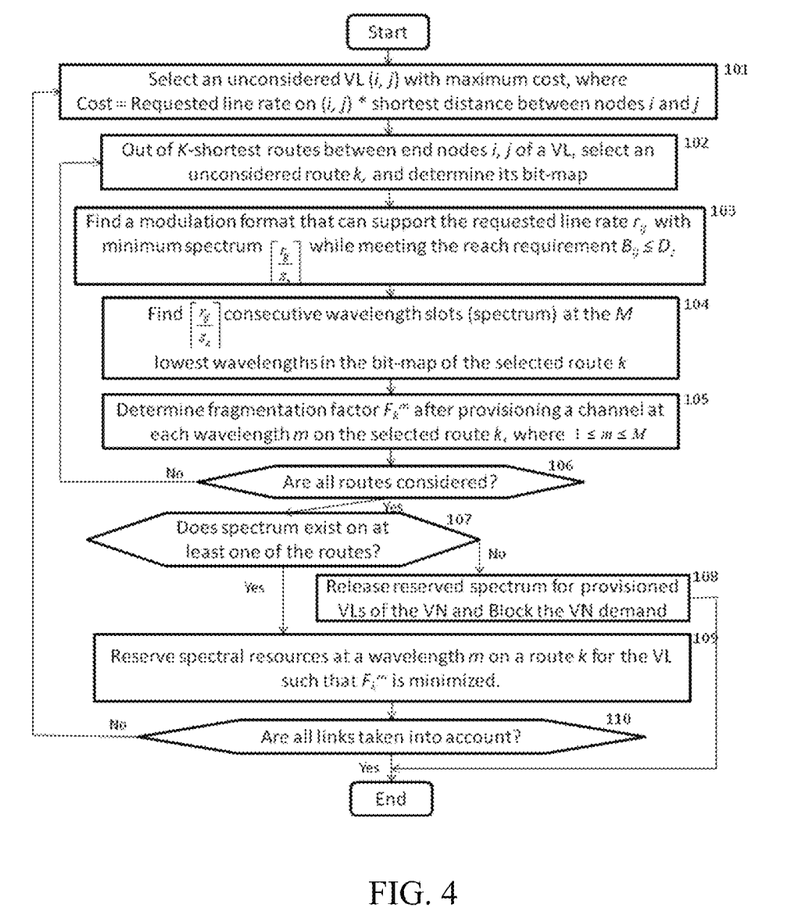
FIG. 4 depicts a flowchart of the (M, K)-Fragmentation-Aware VN Embedding Procedure.

The details of (M, K)-Fragmentation-Aware VN Embedding Procedure is described in terms of the flow chart as shown in FIG. 4 as follows:

In Step 101, the procedure selects an unconsidered VL (i, j) with the maximum cost, where i, j∈N are the end nodes of the VL and cost is defined as a product of the requested line rate over the VL and the shortest path distance between end nodes of the VL.

In Step 102, the procedure selects an unconsidered route k out of K-shortest routes, and determines the bit-map of the route. The bit-map of a route can be determined by performing bit-wise logical-AND operations on the bit-vectors of all fibers along the route.

In Step 103, among the offered set of modulation formats by a variable rate transponder, the procedure selects a modulation format that requires the minimum amount of spectrum $$\left\lceil \frac{r_{ij}}{S_z} \right\rceil$$

to support the requested line rate while meeting the transmission reach requirement $B^k_{ij} \leq D_z$, where $B_{ij}^k$ denotes the physical distance of a route k between the end nodes of the virtual link (i, j).

In Step 104, in the bit-map of the selected route k, the procedure finds $$\left\lceil \frac{r_{ij}}{S_z} \right\rceil$$

number of consecutive wavelength slots at M lowest wavelengths.

In Step 105, the procedure finds the fragmentation factor $F_k^m$ at each found wavelength m on the route k, where $1 \leq m \leq M$.

In Step 106, the procedure checks whether all K-shortest routes considered. If all K-shortest routes are already taken into account, then the procedure follows Step 107, otherwise the procedure repeats Step 102.

In Step 107, the procedure checks whether sufficient spectrum exists on at least one of the K-shortest routes. If sufficient spectrum does not exist, then the procedure follows Step 108, otherwise the procedure follows Step 109.

In Step 108, the procedure releases the reserved spectral resources for the provisioned VLs of the VN, and blocks the VN demand. Finally, the procedure is terminated.

In Step 109, the procedure selects a wavelength m and a route k such that the fragmentation factor $F_k^m$ is minimized. Finally, the VL is provisioned on the selected wavelength m on the selected route k.

In Step 110, the procedure checks whether all VLs are provisioned. If at least one of the VLs is not yet provisioned, the procedure repeats Step 101, otherwise the procedure is terminated.

The methods disclosed herein can be implemented in a network apparatus.

An impairment-aware VN embedding procedure (namely, (M, K)-Fragmentation-Aware VN Embedding procedure) to embed VNs over software defined flexible grid WDM networks includes 1) provisioning each VL of a VN one-by-one based on the cost function, where cost function is the product of the requested line rate on the VL and the distance of the shortest route between the end nodes of the VL, 2) mapping a VL over one of the K-shortest routes, 3) provisioning spectrum for a VL at one of the M lowest wavelengths, and 4) selecting a wavelength and a route that minimizes fragmentation of the network.

In 1), the cost function is the product of the requested line rate on the VL and the distance of the shortest route between the end nodes of the VL, in the order of increasing the probability of provisioning VLs with longer distance and higher line rates.

In 2), by limiting mapping of a VL on one of the K-shortest routes, the over-provisioning of resources is minimized while achieving load balancing over fibers.

In 3), this mapping packs VLs in minimum spectrum while reducing fragmentations.

In 4), probability of provisioning future VN connections is maximized.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A method implemented in a network apparatus used in a wavelength division multiplexing (WDM) optical network, the method comprising:

(a) selecting unconsidered virtual link (VL) (i,j) with a maximum cost, a cost being requested line rate $r_{ij}$ on VL(i, j)×shortest distance between nodes i and j;

(b) selecting unconsidered route k out of K-shortest routes between nodes i and j of VL(i, j);

(c) determining a bit map of unconsidered route k;

(d) finding a modulation format that supports requested line rate $r_{ij}$ with minimum spectrum $$\left\lceil \frac{r_{ij}}{S_z} \right\rceil,$$

where $S_z$ is spectral efficiency with which the modulation format transmits a channel;

(e) finding $$\left\lceil \frac{r_{ij}}{S_z} \right\rceil$$

consecutive spectrum slots at M lowest wavelengths in the bit map of selected route k; and (f) determining fragmentation factor $F_k^{km}$ after provisioning a channel at each wavelength m on selected route k, where 1≤m≤M.

2. The method as in claim 1, wherein fragmentation factor $F_k^m$ is found while meeting reach requirement $B_{ij} \leq D_z$, where $B_{ij}$ denotes a distance of route k between end nodes i and j of VL(i, j) and $D_z$ denotes a distance up to which the modulation format transmits the channel.

3. The method as in claim 1, further comprising:
    iterating steps (b) to (f) until all routes are considered.

4. The method as in claim 3, further comprising:
    h) releasing a reserved spectrum for provisioned VLs, and blocking a virtual network (VN) demand in case that a spectrum does not exist on the K-shortest routes; and
    g) reserving spectral resources at wavelength m on route k for the VL such that $F_k^m$ is minimized in case that a spectrum exists on route k out of the K-shortest routes.

5. The method as in claim 4, further comprising:
    iterating steps (a) to (h) until all virtual links are considered.

6. The method as in claim 1, wherein the WDM optical network comprises a software defined network (SDN) or a flexible grid network.

7. The method as in claim 1, wherein the fragmentation factor is determined according to the following formula:

$$FF = \left[1 - \left\{\frac{1}{T}\sum_{\forall (s,d)} \left(\frac{1}{K}\sum_{k=1}^{k=K}\sum_{l \in L}\left(Q_l \times \alpha_l^{s,d,k}\right)\right)\right\}\right],$$

where T is granularity at which a spectrum is slotted, (s, d) (s, d∈V and |V|≤K, where V is a set of ROADM nodes) denotes a node pair, L is an offered set of line rates, l denotes a line rate, $Q_l$ is a probability of requesting line rate l, and $\alpha_l^{s,d,k}$ is a probability of provisioning a connection with line rate l on route k between node pair (s, d).

8. A method implemented in a network apparatus used in a wavelength division multiplexing (WDM) optical network, the method comprising:

(a) provisioning each virtual link (VL) of a virtual network (VN) according to a cost function, where the cost function is a product of requested line rate $r_{ij}$ on VL(i, j) and shortest distance between nodes i and j;

(b) mapping said each VL over one of the K-shortest routes between nodes i and j of VL(i, j);

(c) provisioning a spectrum for VL(i, j) at M lowest wavelengths; and (d) selecting a wavelength and a route that minimizes fragmentation.

9. The method as in claim 8, wherein said each virtual link (VL) is provisioned so as to increase a probability of provisioning VLs with a longer distance and a higher line rate.

10. The method as in claim 8, further comprising:
limiting mapping of said each VL such that the over-provisioning of resources is minimized while achieving load balancing over fibers.

11. The method as in claim 8, wherein the spectrum is provisioned such that the VLs are packed in a minimum spectrum while reducing fragmentation.

12. The method as in claim 8, wherein the wavelength and the route are selected such that probability of provisioning future VN connections is maximized.

* * * * *